(12) United States Patent
Ozawa et al.

(10) Patent No.: US 9,734,363 B2
(45) Date of Patent: Aug. 15, 2017

(54) CARD READER

(71) Applicant: NIDEC SANKYO CORPORATION, Suwa-gun, Nagano (JP)

(72) Inventors: Shigeki Ozawa, Nagano (JP); Kazutoshi Ishikawa, Nagano (JP); Katsuhisa Higashi, Nagano (JP); Kazunori Takahashi, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days.

(21) Appl. No.: 14/960,856

(22) Filed: Dec. 7, 2015

(65) Prior Publication Data

US 2016/0162712 A1 Jun. 9, 2016

(30) Foreign Application Priority Data

Dec. 8, 2014 (JP) ................. 2014-247684

(51) Int. Cl.
*G06K 7/00* (2006.01)
*G06K 7/08* (2006.01)
*G06K 13/08* (2006.01)

(52) U.S. Cl.
CPC .......... *G06K 7/084* (2013.01); *G06K 13/0875* (2013.01); *G06K 7/0056* (2013.01)

(58) Field of Classification Search
CPC ...... G06K 7/0004; G06K 7/084; G06K 13/08; G06K 13/073; G06K 13/107; G06K 7/0021; G06K 13/077; G06K 7/04; G06K 13/06; G06K 7/015; G06K 13/063
USPC ....... 235/440, 475, 478, 479, 481, 482, 483, 235/484, 485, 486
See application file for complete search history.

(56) References Cited

U.S. PATENT DOCUMENTS

| 5,850,079 A | * | 12/1998 | Ohwa | G06K 7/084 |
| | | | | 194/351 |
| 2013/0299582 A1 | * | 11/2013 | Ozawa | G06K 7/0091 |
| | | | | 235/440 |
| 2014/0353379 A1 | * | 12/2014 | Miyabe | G06K 7/084 |
| | | | | 235/449 |
| 2015/0254534 A1 | * | 9/2015 | Akahane | G06K 13/067 |
| | | | | 235/476 |

FOREIGN PATENT DOCUMENTS

JP          2013037555 A       2/2013

* cited by examiner

*Primary Examiner* — Karl D Frech
(74) *Attorney, Agent, or Firm* — Cantor Colburn LLP

(57) ABSTRACT

A card reader may include a card passage where a card inserted into an insertion port for the card is passed, a shutter member for closing the card passage, a magnetic head disposed on a rear side relative to the shutter member and structured to perform reading of magnetic data recorded in a magnetic stripe of the card and/or recording of magnetic data to the magnetic stripe, and a foreign matter detection mechanism which is structured to detect a foreign matter attached to the card passage. The foreign matter detection mechanism is disposed on a rear side relative to the shutter member and is disposed at a position in the width direction of the card where the magnetic stripe is passed. The foreign matter detection mechanism may be structured of an electrostatic capacitance sensor.

19 Claims, 1 Drawing Sheet

Control Section

CARD READER

CROSS REFERENCE TO RELATED APPLICATION

The present invention claims priority under 35 U.S.C. §119 to Japanese Application No. 2014-247684 filed Dec. 8, 2014, the entire content of which is incorporated herein by reference.

FIELD OF THE INVENTION

At least an embodiment of the present invention may relate to a card reader which is structured to read data recorded in a card and record data to a card.

BACKGROUND

Conventionally, a card reader structured to read magnetic data recorded on a card and/or to record magnetic data on a card has been widely utilized. In an industry of the financial institutions and the like where the card reader is utilized, conventionally, a so-called skimming has become a serious problem in which a criminal attaches a magnetic head to a card insertion part of the card reader to illegally acquire magnetic data of a card by using the magnetic head. In order to prevent the problem, a card reader has been proposed which is provided with a metal sensor for detecting a magnetic head for skimming (hereinafter, referred to as a "skimming magnetic head") which is attached to a front face side of a card insertion part (see, for example, Japanese Patent Laid-Open No. 2013-37555).

In the card reader described in the above-mentioned Patent Literature, the metal sensor is disposed in an inside of the card insertion part which is formed in a hollow shape. Further, the metal sensor includes a core which is formed of magnetic material and a pair of excitation coils and a detection coil which are wound around the core. In the card reader, when a foreign matter including metal material is detected by the metal sensor, a predetermined abnormality processing is executed and reading of magnetic data by the skimming magnetic head attached to the front face side of the card insertion part can be prevented.

A trick for skimming by a criminal has become skillfully year by year and a situation has occurred such that a device for skimming (hereinafter, referred to as a "skimming device") such as a skimming magnetic head for reading magnetic data of a card is attached to an inside of the card reader where a skimming device has not been conventionally attached. In the card reader described in the above-mentioned Patent Literature, a skimming device attached to a front face side of a card insertion part can be detected by a metal sensor. However, the metal sensor is unable to detect a skimming device which is attached inside the card reader. Therefore, in the card reader, when a skimming device is attached to an inside of the card reader, reading of magnetic data by the skimming device cannot be prevented.

Even when a skimming device is attached to an inside of the card reader, an outward appearance of the card reader is not changed and thus it is hard to be noticed that the skimming device has been attached to the card reader. Therefore, if a skimming device is attached to an inside of a card reader, a possibility that skimming is performed for a long term is increased and thus serious damage may be suffered.

SUMMARY

In view of the problem described above, at least an embodiment of the present invention may advantageously provide a card reader capable of detecting a skimming device which is attached to an inside of the card reader.

According to at least an embodiment of the present invention, there may be provided a card reader including a card passage where a card inserted into an insertion port for the card is passed, a shutter member for closing the card passage, a magnetic head which is disposed on a rear side relative to the shutter member and is structured to perform reading of magnetic data recorded in a magnetic stripe of the card and/or recording of magnetic data to the magnetic stripe, and a foreign matter detection mechanism which is structured to detect a foreign matter attached to the card passage. When a direction perpendicular to a thickness direction of the card inserted into the insertion port and a passing direction of the card is referred to as a width direction of the card, the foreign matter detection mechanism is disposed on a rear side relative to the shutter member and is disposed at a position where the magnetic stripe is passed in the width direction of the card.

In the card reader in at least an embodiment of the present invention, the foreign matter detection mechanism for detecting a foreign matter which is attached to the card passage is disposed on a rear side relative to the shutter member and is disposed at a position where the magnetic stripe is passed in the width direction of the card. Therefore, according to at least an embodiment of the present invention, it can be detected that a skimming device has been attached to the inside of the card reader based on a detected result of the foreign matter detection mechanism which is disposed on a rear side relative to the shutter member. Accordingly, in at least an embodiment of the present invention, when it is detected that a skimming device has been attached to the inside of the card reader, a predetermined abnormality processing is executed and thereby reading of magnetic data by the skimming device is prevented.

In at least an embodiment of the present invention, the foreign matter detection mechanism is disposed between the shutter member and the magnetic head in the passing direction of the card. It is assumed that a possibility that a skimming device is disposed between the shutter member and the magnetic head is higher than a possibility that a skimming device is disposed on a rear side relative to the magnetic head. Therefore, according to this structure, it can be effectively detected that a skimming device has been attached to the inside of the card reader.

In at least an embodiment of the present invention, the foreign matter detection mechanism is structured of an electrostatic capacitance sensor. According to this structure, even when the foreign matter detection mechanism is disposed on a rear side relative to the shutter member, the foreign matter detection mechanism does not affect reading of magnetic data and recording of magnetic data by using the magnetic head. Further, it is further preferable that the electrostatic capacitance sensor is disposed on both sides interposing the card passage. According to this structure, even when a skimming device has been attached, wireless transmission of magnetic data from the skimming device to the outside of the card reader can be restricted.

In at least an embodiment of the present invention, the electrostatic capacitance sensor is formed in a sheet shape. According to this structure, even when the electrostatic capacitance sensor is disposed on a rear side relative to the shutter member, the size of the card reader can be reduced.

In at least an embodiment of the present invention, the electrostatic capacitance sensor is provided with a detection face for detecting the foreign matter and the detection face is formed with a disconnection detection pattern for detecting its own disconnection. According to this structure, in a case that a criminal performs some trick on the electrostatic capacitance sensor, the disconnection detection pattern is disconnected and thus, based on a detected result of the disconnection detection pattern, it can be detected that a criminal has performed some trick on the electrostatic capacitance sensor.

In at least an embodiment of the present invention, the card reader includes an optical sensor which includes a light emitting element and a light receiving element and is disposed on a rear side relative to the shutter member for detecting the card, and a control section into which an output signal of the electrostatic capacitance sensor and an output signal of the optical sensor are inputted. The control section detects the foreign matter attached to the card passage based on the output signal of the electrostatic capacitance sensor and the output signal of the optical sensor. According to this structure, in a case that a level of an output signal of the electrostatic capacitance sensor is varied in synchronization with variation of a level of an output signal of the optical sensor, a card is moved along the card passage and the control section determines that a foreign matter is not attached to the card passage. On the other hand, in a case that, although a level of an output signal of the optical sensor is not varied, a level of an output signal of the electrostatic capacitance sensor is varied, the control section can determine that a foreign matter has been attached to the card passage. Therefore, it can be detected with a high degree of accuracy whether a foreign matter has been attached to the card passage or not. Further, in a case that, although a level of an output signal of the optical sensor is varied, a level of an output signal of the electrostatic capacitance sensor does not vary, the control section can determine that some trick has been performed on the electrostatic capacitance sensor. Further, in a case that, although a level of an output signal of the optical sensor does not exceed a predetermined threshold value, when a level of an output signal of the electrostatic capacitance sensor becomes a predetermined threshold value or more, the control section may determine that a foreign matter has been attached to the card passage. Further, in a case that, although a level of an output signal of the optical sensor becomes a predetermined threshold value or more, when a level of an output signal of the electrostatic capacitance sensor does not exceed a predetermined threshold value, the control section may determine that a foreign matter has been attached to the card passage.

In at least an embodiment of the present invention, when one side in the thickness direction of the card is referred to as a first direction and the other side in the thickness direction of the card is referred to as a second direction, the electrostatic capacitance sensor is disposed on the first direction side relative to the card passage, and a portion of a face on the second direction side of the card passage facing the electrostatic capacitance sensor is formed with a protruded part protruding to the first direction side. According to this structure, a difference can be made small between a level of an output signal of the electrostatic capacitance sensor when a largely curved card is passed through a portion of the card passage where the electrostatic capacitance sensor is disposed and a level of an output signal of the electrostatic capacitance sensor when a card without being curved is passed through the portion of the card passage where the electrostatic capacitance sensor is disposed. Therefore, regardless of a curved state of a card which is inserted into the insertion port, it can be detected whether a foreign matter has been attached to the card passage or not with a high degree of accuracy based on a detected result of the electrostatic capacitance sensor.

In at least an embodiment of the present invention, the card reader includes a control section into which an output signal of the foreign matter detection mechanism is inputted and the control section stores a standby signal level which is a level of an output signal of the foreign matter detection mechanism in a standby state before the card is inserted into the card reader, and the control section determines that the foreign matter has been attached to the card passage when a state that a variation amount of a level of an output signal of the foreign matter detection mechanism with respect to the standby signal level becomes a predetermined threshold value or more is continued for a predetermined time or more. According to this structure, even when a variation amount of a level of an output signal of the foreign matter detection mechanism with respect to the standby signal level becomes the predetermined threshold value or more momentarily or for a short time by some influences, the control section does not determine that a foreign matter has been attached to the card passage. Therefore, it can be detected whether a foreign matter has been attached to the card passage or not with a high degree of accuracy.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings.

(Structure of Card Reader)

Figure 1:
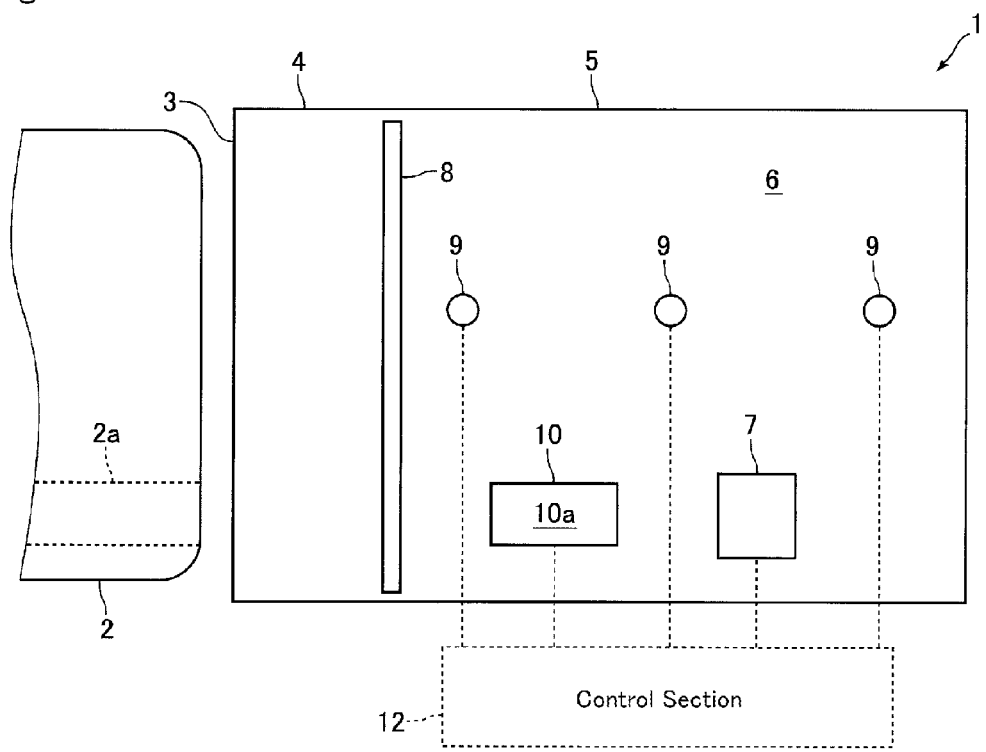
FIG. 1 is a plan view showing a schematic structure of a card reader in accordance with an embodiment of the present invention.
Figure 1:
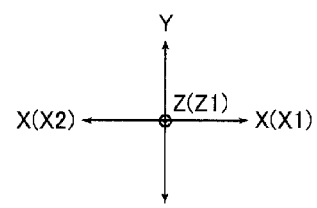
Figure 2:
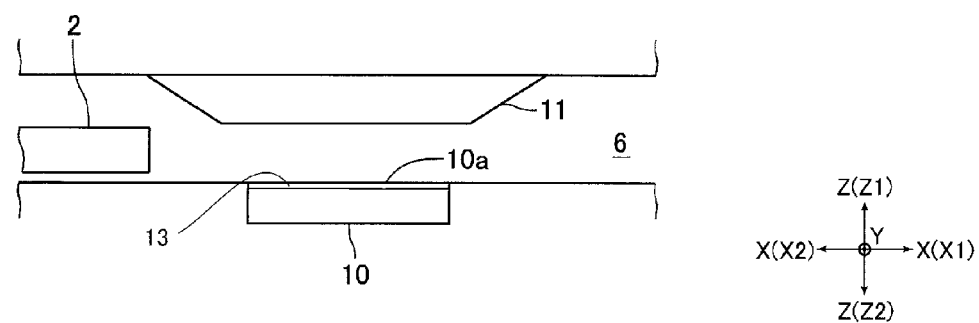
FIG. 2 is a side view showing a structure of a foreign matter detection mechanism and its surrounding portion in a card passage shown in FIG. 1.

FIG. 1 is a plan view showing a schematic structure of a card reader 1 in accordance with an embodiment of the present invention. FIG. 2 is a side view showing a structure of a foreign matter detection mechanism 10 and its surrounding portion in a card passage 6 shown in FIG. 1.

A card reader 1 in this embodiment is a device which is structured to perform reading of magnetic data recorded on a card 2 and/or recording of magnetic data on a card 2 and is, for example, mounted and used in a host apparatus such as an ATM (Automated Teller Machine). The card reader 1 includes a card insertion part 4 formed with an insertion port 3 into which a card 2 is inserted and a main body part 5 to which the card insertion part 4 is fixed. A card passage 6 where a card 2 inserted into the insertion port 3 is passed is formed in an inside of the card reader 1. Further, a drive roller (not shown) and a pad roller (not shown) for conveying a card 2 are disposed in the inside of the card reader 1 and a card 2 inserted into the insertion port 3 is conveyed along the card passage 6.

In this embodiment, a card 2 is conveyed and passed in an "X" direction shown in FIG. 1 and the like. In other words, the "X" direction is a passing direction of a card 2. Specifically, a card 2 is inserted in an "X1" direction and the card 2 is ejected in an "X2" direction. Further, a "Z" direction in FIG. 1 and the like which is perpendicular to the "X" direction is a thickness direction of a card 2, and a "Y" direction in FIG. 1 and the like which is perpendicular to the "X" direction and the "Z" direction is a width direction (short width direction) of the card 2. In the following descriptions, the "X" direction is referred to as a front and rear direction, the "Y" direction is referred to as a right and left direction, and the "Z" direction is referred to as an upper and lower direction. Further, the "X1" direction side is referred to as a "back" (rear) side, the "X2" direction side is referred to as a "front" side, a "Z1" direction side is referred to as an "upper" side, and a "Z2" direction side is referred to as a "lower" side. In this embodiment, the "Z2" direction (lower direction) side is a first direction side which is one side in the thickness direction of a card 2, and the "Z1" direction (upper direction) side is a second direction side which is the other side in the thickness direction of the card 2.

A card 2 is, for example, a rectangular card made of vinyl chloride whose thickness is about 0.7-0.8 mm. A magnetic stripe 2a in which magnetic data are recorded is formed on a rear face (under face) of the card 2. An IC chip may be incorporated in the card 2. Further, the card 2 may be a PET (polyethylene terephthalate) card whose thickness is about 0.18-0.36 mm or may be a paper card having a predetermined thickness.

The card reader 1 includes a magnetic head 7 structured to read magnetic data recorded in a magnetic stripe 2a of a card 2 and/or record magnetic data to the magnetic stripe 2a, a shutter member 8 for closing the card passage 6, optical sensors 9 for detecting existence/absence of the card 2 in the card passage 6, and a foreign matter detection mechanism 10 structured to detect that a foreign matter has been attached to the card passage 6. The foreign matter detection mechanism 10 in this embodiment is structured of an electrostatic capacitance sensor for detecting a foreign matter based on a variation of electrostatic capacitance. Therefore, in the following descriptions, the foreign matter detection mechanism 10 in this embodiment is described as an "electrostatic capacitance sensor 10".

A card insertion part 4 is attached to a front end face of the main body part 5. A shutter member 8 is disposed in a boundary portion between the card insertion part 4 and the main body part 5 or in a rear end side portion of the card insertion part 4. The shutter member 8 is connected with a shutter drive mechanism not shown. The shutter member 8 is movable between a closing position where the shutter member 8 closes the card passage 6 and an open position where the shutter member 8 is retreated from the card passage 6 so that the card passage 6 is opened. In this embodiment, an insertion detection mechanism (not shown) for detecting that a card 2 has been inserted into the insertion port 3 is provided in the card insertion part 4. The insertion detection mechanism is disposed on a front side relative to the shutter member 8.

The magnetic head 7 is disposed in an inside of the main body part 5 and is disposed on a rear side relative to the shutter member 8. The magnetic head 7 is disposed so that its gap part faces the card passage 6 from a lower side. Further, the magnetic head 7 is disposed at a position in the right and left direction where a magnetic stripe 2a of a card 2 inserted from the insertion port 3 is passed. An optical sensor 9 is a transmission type sensor which includes a light emitting element and a light receiving element which are oppositely disposed so as to interpose the card passage 6. The optical sensor 9 is disposed in an inside of the main body part 5 and is disposed on a rear side relative to the shutter member 8. In this embodiment, a plurality of the optical sensors 9 is disposed in a separated state with a space therebetween in the front and rear direction. In accordance with an embodiment of the present invention, the optical sensor 9 may be a reflection type sensor which includes a light emitting element and a light receiving element adjacently disposed to an upper side or a lower side of the card passage 6.

The electrostatic capacitance sensor 10 is a thin film type sensor which is formed in a sheet shape. The electrostatic capacitance sensor 10 is provided with a detection face 10a for detecting a foreign matter. The detection face 10a is formed with a disconnection detection pattern 13 for detecting its own disconnection. The disconnection detection pattern 13 is structured of one wiring line formed by a one-stroke drawing method which is formed of one thin continuous connected line and an area provided with the wiring line by the one-stroke drawing method covers the entire surface of the detection face 10a and, even in a case that only a part of the wiring line is disconnected, the disconnected state can be detected. For example, when a part of the wiring line formed by a one-stroke drawing method is disconnected by some trick which is performed on the detection face 10a, the disconnected state can be detected as an abnormal condition. The electrostatic capacitance sensor 10 is disposed in an inside of the main body part 5 and is disposed on a rear side relative to the shutter member 8. Further, the electrostatic capacitance sensor 10 is disposed at a position in the right and left direction where a magnetic stripe 2a of a card 2 inserted from the insertion port 3 is passed. In this embodiment, the electrostatic capacitance sensor 10 is disposed between the magnetic head 7 and the shutter member 8 in the front and rear direction. The electrostatic capacitance sensor 10 is disposed at a position where it does not overlap with the optical sensor 9 when viewed in the upper and lower direction.

As shown in FIG. 2, the electrostatic capacitance sensor 10 is disposed to a lower side of the card passage 6. Specifically, the electrostatic capacitance sensor 10 is disposed to a lower side of the card passage 6 so that its detection face 10a is directed to an upper side. A protruded part 11 protruding toward a lower side is formed on a portion of an upper face of the card passage 6 which faces the electrostatic capacitance sensor 10. An under face of the protruded part 11 is, for example, formed in a flat face shape which is perpendicular to the upper and lower direction.

The card reader 1 includes a control section 12 with which the magnetic head 7, the optical sensors 9 and the electrostatic capacitance sensor 10 are connected. An output signal of the magnetic head 7, output signals of the optical sensors 9 and an output signal of the electrostatic capacitance sensor 10 are inputted into the control section 12. Further, the shutter drive mechanism for driving the shutter member 8 is connected with the control section 12.

When a level of an output signal of the electrostatic capacitance sensor 10 in a standby state of the card reader 1 before a card 2 is inserted into the card reader 1 is referred to as a standby signal level, the control section 12 stores the standby signal level and, in a case that a state that a variation amount of a level of an output signal of the electrostatic capacitance sensor 10 with respect to the standby signal level becomes a predetermined threshold value or more is continued for a predetermined time or more, the control section 12 determines that a foreign matter such as a skimming device has been attached to the card passage 6. For example, when a state that a variation amount of a level of an output signal of the electrostatic capacitance sensor 10 with respect to the standby signal level becomes a predetermined threshold value or more is continued for a time longer than a processing time of a card 2 in the card reader 1 (specifically, a normal processing time of a normal card 2 in the card reader 1), the control section 12 determines that a foreign matter such as a skimming device has been attached to the card passage 6. Whether the card reader 1 is in a standby state before a card 2 is inserted or not is detected on the basis of whether the insertion detection mechanism provided in the card insertion part 4 detects a card 2 or not. The detection by the insertion detection mechanism has been conventionally well known and thus its detailed description is omitted. As described above, a level of an output signal of the electrostatic capacitance sensor 10 in a standby state of the card reader 1 is stored in the control section 12 as a standby signal level.

When the control section 12 determines that a foreign matter has been attached to the card passage 6, the control section 12 executes a predetermined abnormality processing. For example, the control section 12 notifies a predetermined alarm to a host apparatus. Further, in a case that the control section 12 determines that a foreign matter has not been attached to the card passage 6, when it is detected that a card 2 is inserted into the insertion port 3, the control section 12 drives the shutter drive mechanism to move the shutter member 8 located at the closing position to the open position.

When a card 2 is inserted into the insertion port 3 and the card 2 is passed along the card passage 6, the electrostatic capacitance sensor 10 detects the card 2 and a level of an output signal of the electrostatic capacitance sensor 10 is varied. The variation amount of the level of the output signal is substantially constant. Therefore, the threshold value which is compared with a variation amount of a level of the output signal of the electrostatic capacitance sensor 10 with respect to the standby signal level is set to be a value which is based on an amount of variation of the level of the output signal of the electrostatic capacitance sensor 10 when the electrostatic capacitance sensor 10 detects the card 2 and, in addition, the threshold value is set so that a foreign matter having been attached to the card passage 6 is correctly detected. The predetermined time is set to be variable.

Principal Effects in this Embodiment

As described above, in at least an embodiment of the present invention, the electrostatic capacitance sensor 10 for detecting a foreign matter attached to the card passage 6 is disposed on a rear side relative to the shutter member 8 and is disposed at a position in the right and left direction where a magnetic stripe 2a of a card 2 is passed. Therefore, according to this embodiment, based on a detected result of the electrostatic capacitance sensor 10 disposed on a rear side relative to the shutter member 8, it can be detected that a skimming device has been attached in an inside of the card reader 1 (specifically, in an inside of the main body part 5). Further, in at least an embodiment of the present invention, when the control section 12 detects that a skimming device has been attached to an inside of the main body part 5, the control section 12 executes a predetermined abnormality processing such that a predetermined alarm is notified to a host apparatus. Therefore, according to this embodiment, even when a skimming device is attached to an inside of the main body part 5, reading of magnetic data by the skimming device can be prevented.

It is assumed that a possibility that a skimming device is disposed between the magnetic head 7 and the shutter member 8 is higher than a possibility that a skimming device is disposed on a rear side relative to the magnetic head 7. However, in this embodiment, the electrostatic capacitance sensor 10 is disposed between the magnetic head 7 and the shutter member 8 and thus it can be effectively detected that a skimming device has been attached to an inside of the main body part 5.

In at least an embodiment of the present invention, the control section 12 stores a standby signal level which is a level of an output signal of the electrostatic capacitance sensor 10 in a standby state before a card 2 is inserted into the card reader 1 and, when a state that a variation amount of the level of the output signal of the electrostatic capacitance sensor 10 with respect to the standby signal level becomes a predetermined threshold value or more is continued for a predetermined time or more, the control section 12 determines that a foreign matter such as a skimming devices has been attached to the card passage 6. In other words, in this embodiment, even when a variation amount of a level of an output signal of the electrostatic capacitance sensor 10 with respect to the standby signal level becomes the predetermined threshold value or more momentarily or for a short time by some influences, the control section 12 does not determine that a foreign matter such as a skimming device has been attached to the card passage 6. Therefore, according to this embodiment, it can be detected whether a foreign matter has been attached to the card passage 6 or not with a high degree of accuracy.

In at least an embodiment of the present invention, the protruded part 11 is formed on a portion facing the electrostatic capacitance sensor 10 of an upper face of the card passage 6. Therefore, according to this embodiment, a difference can be made small between a level of an output signal of the electrostatic capacitance sensor 10 when a largely curved card 2 is passed through a portion of the card passage 6 where the electrostatic capacitance sensor 10 is disposed and a level of an output signal of the electrostatic capacitance sensor 10 when a card 2 without being curved is passed through the portion of the card passage 6 where the electrostatic capacitance sensor 10 is disposed. Therefore, according to this embodiment, regardless of a curved state of a card 2 which is inserted into the insertion port 3, it can be detected whether a foreign matter has been attached to the card passage 6 or not with a high degree of accuracy based on a detected result of the electrostatic capacitance sensor 10.

In at least an embodiment of the present invention, the electrostatic capacitance sensor 10 is a thin film-shaped sensor which is formed in a sheet shape. Therefore, according to this embodiment, even when the electrostatic capacitance sensor 10 is disposed on a rear side relative to the shutter member 8, the size of the card reader 1 can be reduced. Further, in at least an embodiment of the present invention, a disconnection detection pattern 13 for detecting its own disconnection is formed on the detection face 10a of the electrostatic capacitance sensor 10 and thus, when a criminal performs some trick on the electrostatic capacitance sensor 10, the disconnection detection pattern 13 is disconnected. Therefore, according to this embodiment, based on a detected result of the disconnection detection pattern 13, it can be detected that a criminal has performed some trick on the electrostatic capacitance sensor 10.

Other Embodiments

Although the present invention has been shown and described with reference to a specific embodiment, various changes and modifications will be apparent to those skilled in the art from the teachings herein.

In the embodiment described above, the electrostatic capacitance sensor 10 is disposed between the magnetic head 7 and the shutter member 8. However, the electrostatic capacitance sensor 10 may be disposed on a rear side relative to the magnetic head 7. Further, in the embodiment described above, a disconnection detection pattern 13 is formed on the detection face 10a of the electrostatic capacitance sensor 10. However, no disconnection detection pattern may be formed on the detection face 10a. In addition, in the embodiment described above, the electrostatic capacitance sensor 10 is formed in a sheet shape but the electrostatic capacitance sensor 10 may be formed in a block shape. Further, in the embodiment described above, the electrostatic capacitance sensor 10 is disposed to a lower side of the card passage 6. However, the electrostatic capacitance sensor 10 may be disposed to an upper side of the card passage 6. Further, the electrostatic capacitance sensor 10 may be disposed to both sides in an upper and lower direction of the card passage 6 so as to interpose the card passage 6. Specifically, another electrostatic capacitance sensor 10 may be disposed to an upper side of the card passage 6 so as to face the electrostatic capacitance sensor 10 which is disposed to a lower side of the card passage 6. For example, in FIG. 2, another electrostatic capacitance sensor 10 is disposed to an upper side of the protruded part 11.

In the embodiment described above, in a case that a skimming device is attached to an inside of the main body part 5, a criminal is unable to easily detach the skimming device from the card reader 1. Therefore, there is a high possibility that a criminal transmits magnetic data acquired by the skimming device wirelessly to the outside of the card reader 1. However, when the electrostatic capacitance sensor 10 is disposed to both an upper side and a lower side of the card passage 6, efficiency of an antenna for wirelessly transmitting magnetic data from the skimming device to the outside of the card reader 1 is reduced by utilizing a shielding effect of the electrostatic capacitance sensor 10. Further, in order to reduce efficiency of the antenna, a shielding member may be stuck on an inner side face of a front panel of a host apparatus such as an ATM. Further, in order to transmit magnetic data acquired by a skimming device wirelessly to the outside, a battery is required. Therefore, a detection mechanism for detecting a battery may be disposed in a portion where it is assumed that the battery is attached.

In the embodiment described above, the foreign matter detection mechanism 10 for detecting that a foreign matter has been attached to the card passage 6 is structured of an electrostatic capacitance sensor. However, the present invention is not limited to this embodiment. For example, the foreign matter detection mechanism 10 may be structured of a metal sensor (magnetic sensor) which includes a core formed of magnetic material and a detection coil and an excitation coil wound around the core. Further, the foreign matter detection mechanism 10 may be structure of a transmission type or a reflection type optical sensor.

In a case that the foreign matter detection mechanism 10 is structured of a metal sensor, when the foreign matter detection mechanism 10 is disposed in the vicinity of the magnetic head 7, the magnetic field generated by the excitation coil of the metal sensor may affect reading of magnetic data and recording of magnetic data by the magnetic head 7. However, in a case that the foreign matter detection mechanism 10 is structured of an electrostatic capacitance sensor, even when the foreign matter detection mechanism 10 is disposed in the vicinity of the magnetic head 7, the foreign matter detection mechanism 10 does not affect reading of magnetic data and recording of magnetic data by the magnetic head 7.

When the foreign matter detection mechanism 10 is structured of an optical sensor, in a case that a transparent card 2 is inserted into the insertion port 3, the transparent card 2 cannot be detected on the basis of an output signal of the optical sensor 9 and an output signal of the foreign matter detection mechanism 10 (optical sensor). However, when the foreign matter detection mechanism 10 is structured of an electrostatic capacitance sensor, even in a case that a transparent card 2 is inserted into the insertion port 3, the transparent card 2 can be detected. Further, in a case that it is judged that a transparent card 2 is detected by the foreign matter detection mechanism 10 (electrostatic capacitance sensor), the card 2 can be ejected and, after the ejecting operation of the card 2 has been performed, if the output of the foreign matter detection mechanism 10 is not changed, it can be determined that a foreign matter has been attached.

When the foreign matter detection mechanism 10 is structured of an electrostatic capacitance sensor, in a case that a host apparatus on which the card reader 1 is mounted is installed outdoors, there is a possibility that the foreign matter detection mechanism 10 detects liquid such as rainwater. When the foreign matter detection mechanism 10 (electrostatic capacitance sensor) detects liquid such as rainwater, it may be erroneously detected that a foreign matter has been attached to the card passage 6. Therefore, for example, in a case that a host apparatus on which the card reader 1 is mounted is installed outdoors, in other words, in a case that there is a possibility that liquid such as rainwater enters into the card passage 6, it is preferable that the card passage 6 is inclined so that liquid such as rainwater is discharged from the insertion port 3.

In the embodiment described above, when a state that a variation amount of a level of an output signal of the electrostatic capacitance sensor 10 with respect to the standby signal level becomes a predetermined threshold value or more is continued for a predetermined time or more, the control section 12 determines that a foreign matter such as a skimming device has been attached to the card passage 6. However, the present invention is not limited to this embodiment. For example, the control section 12 may detect that a foreign matter such as a skimming device has been attached to the card passage 6 based on an output signal of the optical sensor 9 and an output signal of the electrostatic capacitance sensor 10. Specifically, when a level of an output signal of the electrostatic capacitance sensor 10 becomes a predetermined threshold value or more although a level of an output signal of the optical sensor 9 does not exceed a predetermined threshold value, the control section 12 may determine that a foreign matter such as a skimming device has been attached to the card passage 6. In other words, when a variation of a level of an output signal of the optical sensor 9 and a variation of a level of an output signal of the electrostatic capacitance sensor 10 are not synchronized with each other, the control section 12 may determine that a foreign matter such as a skimming device has been attached to the card passage 6.

As described above, when a card 2 is inserted into the insertion port 3 and the card 2 is passed along the card passage 6, the electrostatic capacitance sensor 10 detects the card 2 and a level of an output signal of the electrostatic capacitance sensor 10 is varied. Therefore, according to this structure, in a case that a level of an output signal of the electrostatic capacitance sensor 10 is varied in synchronization with variation of a level of an output signal of the optical sensor 9, it can be determined that a card 2 is moved along the card passage 6 and a foreign matter is not attached to the card passage 6. On the other hand, in a case that, although a level of an output signal of the optical sensor 9 is not varied, a level of an output signal of the electrostatic capacitance sensor 10 is varied (variation is different from a case of a transparent card 2), it can be determined that a foreign matter such as a skimming device has been attached to the card passage 6. Therefore, it can be detected with a high degree of accuracy whether a foreign matter has been attached to the card passage 6 or not. Further, in a case that, although a level of an output signal of the optical sensor 9 is varied, a level of an output signal of the electrostatic capacitance sensor 10 does not vary, the control section 12 determines that some trick has been performed on the electrostatic capacitance sensor 10.

In this embodiment, although an output signal of the optical sensor 9 is varied and a level of an output signal of the optical sensor 9 becomes a predetermined threshold value or more, when a level of an output signal of the electrostatic capacitance sensor 10 does not exceed a predetermined threshold value, the control section 12 may determine that some foreign matter has been attached to the card passage 6. In this case, it can be detected that some foreign matter which does not change a level of an output signal of the electrostatic capacitance sensor 10 has been attached to the card passage 6.

In the embodiment described above, before the card reader 1 is mounted on a host apparatus, if a criminal recognizes that the card reader 1 is capable of detecting a skimming device attached to an inside of the main body part 5, some trick is performed by the criminal on the card reader 1 before the card reader 1 is mounted on the host apparatus and the card reader 1 after having been mounted on the host apparatus may be unable to detect a skimming device having been attached to an inside of the main body part 5. In order to prevent this problem, it is preferable that the card reader 1 is provided with a predetermined function so that the electrostatic capacitance sensor 10 starts a detecting function after the card reader 1 has been mounted on the host apparatus. Alternatively, it is preferable that the card reader 1 is provided with a function by which a threshold value compared with a variation amount of a level of an output signal of the electrostatic capacitance sensor 10 with respect to its standby signal level is automatically adjusted after the card reader 1 has been mounted on the host apparatus so that the electrostatic capacitance sensor 10 appropriately starts a detecting function after the card reader 1 has been mounted on the host apparatus.

In the embodiment described above, the card reader 1 is a card conveyance type card reader which includes a drive roller and a pad roller. However, the card reader to which the structure of the present invention is applied may be a manual type card reader in which reading and recording of magnetic data are performed while a card 2 is manually moved by a user. For example, the card reader to which the structure of the present invention is applied may be a so-called dip type card reader in which reading and recording of magnetic data are performed when a card 2 is inserted into the card reader or when a card 2 is pulled out from the card reader.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card comprising a magnetic stripe, the card reader comprising:
   a card passage where the card inserted into an insertion port for the card is passed;
   a shutter member structured to close the card passage;
   a magnetic head which is disposed on a rear side relative to the shutter member and is structured to perform reading of magnetic data recorded in the magnetic stripe of the card and/or recording of magnetic data to the magnetic stripe; and
   a foreign matter detection mechanism which is structured to detect a foreign matter attached to the card passage;
   wherein, when a direction perpendicular to a thickness direction of the card inserted into the insertion port and a passing direction of the card is referred to as a width direction of the card, the foreign matter detection mechanism is disposed on a rear side relative to the shutter member and is disposed at a position in the width direction of the card where the magnetic stripe is passed;
   wherein the foreign matter detection mechanism comprises an electrostatic capacitance sensor;
   the card reader comprising:
   an optical sensor which comprises a light emitting element and a light receiving element and is disposed on a rear side relative to the shutter member for detecting the card; and
   a control section into which an output signal of the electrostatic capacitance sensor and an output signal of the optical sensor are inputted;
   wherein the control section is structured to detect the foreign matter attached to the card passage based on the output signal of the electrostatic capacitance sensor and the output signal of the optical sensor.

2. The card reader according to claim 1, wherein the foreign matter detection mechanism is disposed between the shutter member and the magnetic head in the passing direction of the card.

3. The card reader according to claim 1, wherein the electrostatic capacitance sensor is formed in a sheet shape.

4. The card reader according to claim 3, wherein
   the electrostatic capacitance sensor comprises a detection face for detecting the foreign matter, and
   the detection face comprises a disconnection detection pattern for detecting its own disconnection.

5. The card reader according to claim 4, further comprising:
   an optical sensor which comprises a light emitting element and a light receiving element and is disposed on a rear side relative to the shutter member for detecting the card; and
   a control section into which an output signal of the electrostatic capacitance sensor and an output signal of the optical sensor are inputted;
   wherein the control section is structured to detect the foreign matter attached to the card passage based on the output signal of the electrostatic capacitance sensor and the output signal of the optical sensor.

6. The card reader according to claim 5, wherein, when one side in the thickness direction of the card is referred to as a first direction and the other side in the thickness direction of the card is referred to as a second direction,
the electrostatic capacitance sensor is disposed on a first direction side relative to the card passage, and
a portion of a face on a second direction side of the card passage facing the electrostatic capacitance sensor comprises a protruded part protruding to the first direction side.

7. The card reader according to claim 1, wherein the control section is structured to determine that the foreign matter has been attached to the card passage when a level of the output signal of the electrostatic capacitance sensor becomes a predetermined threshold value or more although a level of the output signal of the optical sensor does not vary.

8. The card reader according to claim 1, wherein the control section is structured to determine that some trick has been performed on the electrostatic capacitance sensor when a level of the output signal of the electrostatic capacitance sensor does not vary although a level of the output signal of the optical sensor is varied.

9. The card reader according to claim 1, wherein the control section is structured to determine that the foreign matter has been attached to the card passage when a level of the output signal of the electrostatic capacitance sensor becomes a predetermined threshold value or more although a level of the output signal of the optical sensor does not exceed a predetermined threshold value.

10. The card reader according to claim 1, wherein the control section is structured to determine that the foreign matter has been attached to the card passage when a level of the output signal of the electrostatic capacitance sensor does not exceed a predetermined threshold value although a level of the output signal of the optical sensor becomes a predetermined threshold value or more.

11. The card reader according to claim 1, wherein, when one side in the thickness direction of the card is referred to as a first direction and the other side in the thickness direction of the card is referred to as a second direction,
the electrostatic capacitance sensor is disposed on a first direction side relative to the card passage, and
a portion of a face on a second direction side of the card passage facing the electrostatic capacitance sensor comprises a protruded part protruding to the first direction side.

12. The card reader according to claim 1, further comprising a control section into which an output signal of the electrostatic capacitance sensor is inputted,
wherein the control section is structured to store a standby signal level which is a level of an output signal of the electrostatic capacitance sensor in a standby state before the card is inserted into the card reader, and
wherein the control section is structured to determine that the foreign matter has been attached to the card passage when a state that a variation amount of a level of an output signal of the electrostatic capacitance sensor with respect to the standby signal level becomes a predetermined threshold value or more is continued for a predetermined time or more.

13. The card reader according to claim 12, wherein
the electrostatic capacitance sensor is provided with a detection face for detecting the foreign matter, and
the detection face comprises a disconnection detection pattern for detecting its own disconnection.

14. The card reader according to claim 1, wherein the electrostatic capacitance sensor is disposed on both sides interposing the card passage.

15. The card reader according to claim 1, further comprising a control section into which an output signal of the foreign matter detection mechanism is inputted,
wherein the control section is structured to store a standby signal level which is a level of an output signal of the foreign matter detection mechanism in a standby state before the card is inserted into the card reader, and
wherein the control section is structured to determine that the foreign matter has been attached to the card passage when a state that a variation amount of a level of an output signal of the foreign matter detection mechanism with respect to the standby signal level becomes a predetermined threshold value or more is continued for a predetermined time or more.

16. The card reader according to claim 15, wherein the foreign matter detection mechanism comprises an electrostatic capacitance sensor.

17. The card reader according to claim 16, wherein the electrostatic capacitance sensor is formed in a sheet shape.

18. The card reader according to claim 17, wherein
the electrostatic capacitance sensor comprises a detection face for detecting the foreign matter, and
the detection face comprises a disconnection detection pattern for detecting its own disconnection.

19. The card reader according to claim 16, wherein, when one side in the thickness direction of the card is referred to as a first direction and the other side in the thickness direction of the card is referred to as a second direction,
the electrostatic capacitance sensor is disposed on a first direction side relative to the card passage, and
a portion of a face on a second direction side of the card passage facing the electrostatic capacitance sensor comprises a protruded part protruding to the first direction side.

* * * * *